United States Patent
Kinsey et al.

(10) Patent No.: US 8,578,385 B2
(45) Date of Patent: Nov. 5, 2013

(54) METHOD AND SYSTEM FOR VIRTUAL SERVICE ISOLATION

(75) Inventors: Jeffrey Brian Kinsey, Redmond, WA (US); Pankaj Garg, Redmond, WA (US); Eric P. Traut, Bellevue, WA (US); Jacob Oshins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1880 days.

(21) Appl. No.: 11/112,234

(22) Filed: Apr. 21, 2005

(65) Prior Publication Data

US 2006/0242229 A1 Oct. 26, 2006

(51) Int. Cl.
G06F 9/46 (2006.01)
G06F 9/455 (2006.01)
G06F 11/00 (2006.01)

(52) U.S. Cl.
USPC ............... 718/104; 718/1; 714/2; 714/47.1; 714/48

(58) Field of Classification Search
USPC ............ 718/1, 100, 101, 102, 103, 104, 105, 718/108
See application file for complete search history.

(56) References Cited

U.S. PATENT DOCUMENTS

| | | | |
|---|---|---|---|
| 6,199,179 B1 * | 3/2001 | Kauffman et al. | 714/26 |
| 6,871,341 B1 * | 3/2005 | Shyr | 717/131 |
| 6,944,699 B1 * | 9/2005 | Bugnion et al. | 710/269 |
| 7,032,107 B2 * | 4/2006 | Stutton et al. | 713/2 |
| 7,082,598 B1 * | 7/2006 | Le et al. | 717/127 |
| 7,325,163 B2 * | 1/2008 | Kondajeri et al. | 714/25 |
| 7,356,679 B1 * | 4/2008 | Le et al. | 713/1 |
| 7,370,324 B2 * | 5/2008 | Goud et al. | 718/1 |
| 7,412,702 B1 * | 8/2008 | Nelson et al. | 718/1 |
| 7,415,708 B2 * | 8/2008 | Knauerhase et al. | 718/1 |
| 7,424,710 B1 * | 9/2008 | Nelson et al. | 718/1 |
| 7,478,173 B1 * | 1/2009 | Delco | 709/250 |
| 2003/0037089 A1 * | 2/2003 | Cota-Robles et al. | 709/1 |
| 2004/0158834 A1 * | 8/2004 | Ham et al. | 718/104 |
| 2004/0210705 A1 * | 10/2004 | Armstrong et al. | 711/100 |
| 2004/0221200 A1 * | 11/2004 | Armstrong et al. | 714/30 |
| 2005/0278722 A1 * | 12/2005 | Armstrong et al. | 718/104 |
| 2006/0020943 A1 * | 1/2006 | Boutcher et al. | 718/104 |
| 2006/0031679 A1 * | 2/2006 | Soltis et al. | 713/182 |
| 2006/0064697 A1 * | 3/2006 | Kagi et al. | 718/103 |
| 2006/0070066 A1 * | 3/2006 | Grobman | 718/1 |
| 2006/0130060 A1 * | 6/2006 | Anderson et al. | 718/1 |
| 2006/0230401 A1 * | 10/2006 | Grawrock | 718/1 |
| 2006/0236127 A1 * | 10/2006 | Kurien et al. | 713/193 |
| 2007/0074208 A1 * | 3/2007 | Ling et al. | 718/1 |
| 2007/0174850 A1 * | 7/2007 | El Zur | 719/321 |

* cited by examiner

*Primary Examiner* — Abdullah Al Kawsar
(74) *Attorney, Agent, or Firm* — Woodcock Washburn, LLP (57) ABSTRACT

A method of managing resources in a host computer includes generating a virtual service provider in two different computer partitions and linking them in a serial manner. The virtual service providers are associated with a computer resource. Virtual service clients in different partitions may use the virtual service provider software to access the related computer resources. The virtual service providers provide a transparent interface to the associated hardware. Virtual service clients can use the combination of series computer resource functions or can access the a lesser number of the series connected virtual service providers. Fault tolerance can be built into the scheme using multiple virtual service providers located in different partitions accessible to virtual service clients using a failover control technique.

14 Claims, 8 Drawing Sheets

METHOD AND SYSTEM FOR VIRTUAL SERVICE ISOLATION

FIELD OF THE INVENTION

The invention relates to the field of computer programming. More specifically, the invention relates to providing isolative connectivity to computer resources among many partitions in a virtual machine environment.

BACKGROUND OF THE INVENTION

Virtual computing allows multiple virtual machines, each operating in their own isolated partition, to run on a host computer. The host computer has a virtualizer program that allows the host computer to execute the instructions of a virtual machine program. The host computer virtualizer program can also virtualize the hardware resources of the host machine for virtual machine use. The virtual machine or partition that is requesting hardware resources such as CPU, memory, I/O and disk space is ideally isolated from other partitions.

In a virtual machine environment, another partition only exists in the host computer system as a pure software representation of the operation of one specific hardware architecture. A virtualizer program acts as the interchange between the hardware architecture of the host machine and the instructions transmitted by the software (e.g., operating systems, applications, etc.) running within partitions of the virtual machine environment. In one virtual machine environment embodiment, the virtualizer program may include a virtual machine monitor (VMM) which is a software layer that runs directly above the host hardware, perhaps running side-by-side and working in conjunction with the host operating system, and which can virtualize all the resources of the host machine (as well as certain virtual resources) by exposing interfaces that are the same as the hardware the VMM is virtualizing. This virtualization enables the virtualizer (as well as the host computer system itself) to go unnoticed by operating system layers running above it. In a virtual machine environment, the multiple virtual machines impose performance requirements on the hardware resources of the host machine. It is desirable to keep one virtual machine separated from the other virtual machines as well as separated from the host. Separation or isolation of one virtual machine from another is useful to isolate errors and faults such that one virtual machine fault does not affect another virtual machine. Yet, in some configurations, it is desirable to have one virtual machine access host resources available to a second virtual machine. Therefore, isolation between partitions can become problematic.

Just as computers were made more stable by separating different applications into separate process address spaces, systems can be made even more stable by separating whole software stacks into separate virtual machine partitions. A whole software stack may be thought of as an operating system, including its plug-in modules, an application and any middleware between them. Given a system where one virtual machine or partition has exclusive access to a computer resource, then other partitions must access the "provider" partition in order to utilize or consume the computer resource. Systems that have such isolation partitions but are linked because some partitions are providers and some are consumers or clients of computer resources that have increased detrimental consequences if a fault appears in the provider partition. Under such fault conditions, a provider partition may be affected by faulty software and the dependent client partitions may likewise be affected. As a consequence of faulty software in the provider partition, the operating system hosting the provider functions as well as applications running in the provider partition may also be collaterally affected.

In the context of the present invention, a virtual service provider (VSP) provides input output (I/O) device-related resources to its virtual service clients. These I/O-device-related resources don't necessarily correspond directly to resources provided by a physical device. A virtual service provider consumes device I/O resources, as well as CPU and memory because it is software, and serves those resources to its virtual service clients. The resources consumed by a virtual service provider may come from a single device I/O software stack or from multiple device I/O software stacks. A virtual service provider can have one or more virtual service clients which may or may not exist in the same partition as the virtual service provider. A virtual service client (VSC) consumes the resources given to it by its virtual service provider. A VSC also consumes resources such as CPU and memory because the VSC is software. The virtual service client reserves its granted resources to a software stack layer above it. In other words, the virtual service client can generally be thought of as the device drivers for the I/O-device-related resources that the virtual service provider offered.

Figure 1:
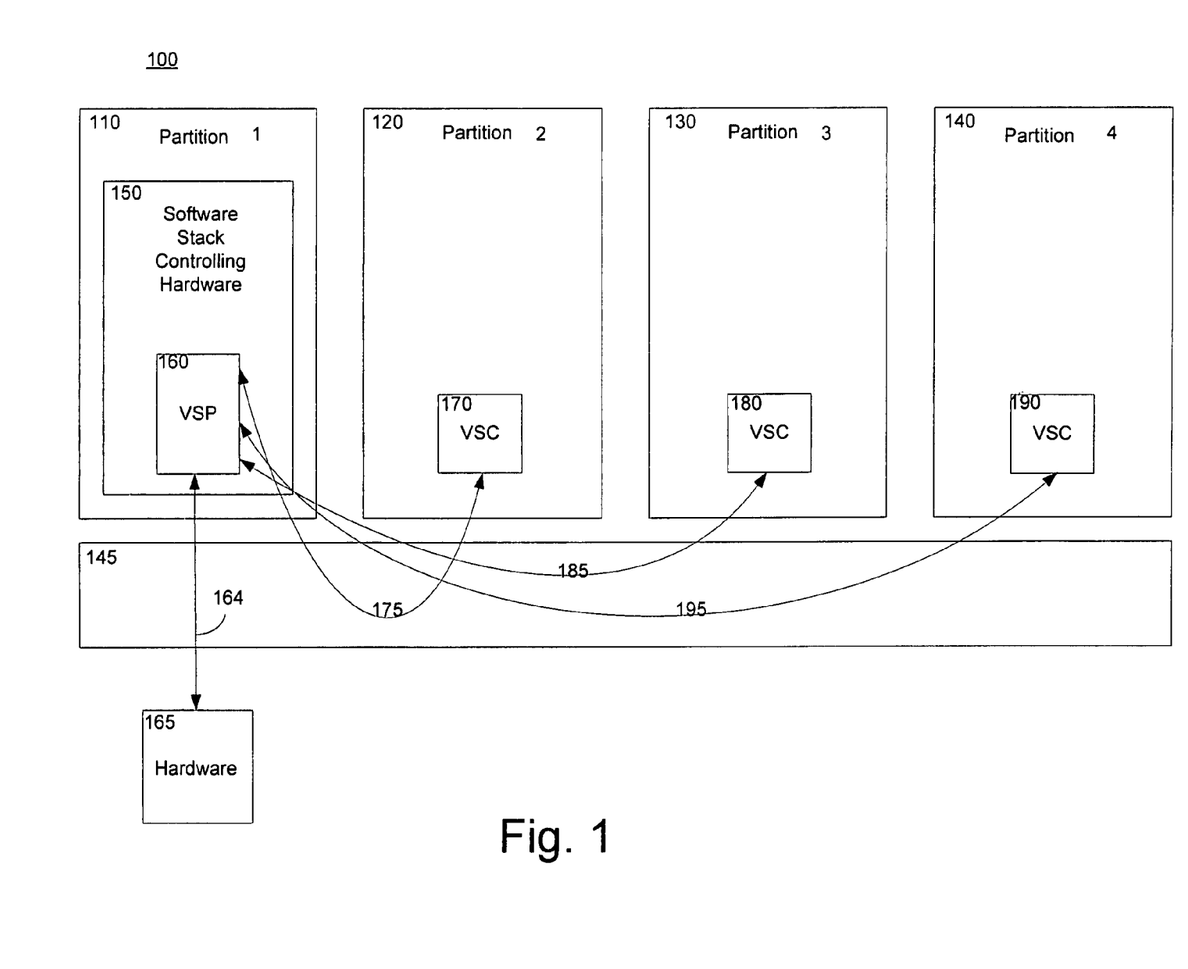
FIG. 1 is an exemplary partitioned system showing the disadvantages of a fault prone architecture.

FIG. 1 depicts a virtual computer system 100 and illustrates an example of an increased risk when using a partition system. In the example system 100, a first partition 110 contains a software stack 150. The software stack generally controls a computer resource such as hardware, software, bandwidth or other computer system resource. In the example embodiment of FIG. 1, the software stack is one that controls hardware. Virtual service provider (VSP) software 160 resides as part of the software stack 150. The software stack 150 may be logically separate from the VSP. In one embodiment, the VSP may be a client that sits on top of a stack. In this instance the hardware 165 is controlled via link 164 from the VSP 160. A second partition 120, a third partition 130 and a fourth partition 140 each have a virtual service client (VSC), 170, 180 and 190 respectively which rely on the VSP 160 in the first partition 110. A communications channel 145, such as a virtualization program or VMM provides a communications path from VSCs 170, 180 and 190 to the VSP 160. Therefore, any fault in the first partition 110 might cascade the through to the VSP 160 and may cause a four fold fault propagation since the VSC 170, 180 and 190 rely on the VSP 160 in partition 1.

FIG. 1 can be modified to contain multiple VSPs in the first partition such that each VSC in the system can share different VSPs in case one VSP fails. However, if a propagating fault appears in the first partition, then the multiple VSPs could be all be adversely affected and there is no real improvement in fault isolation. However, partitioning systems still has advantages.

In addition to reliability, the isolation that virtual machine partitioning enables can also be used to increase security. Components in the lower layers of a software stack, particularly those that run within the context of an operating system kernel, can often access any programs or data within a partition. If the services are moved to their own partition, then programs and data within them have a much smaller attack surface, as only the kernel-mode code within that specific partition can access them. As these partitions can be carefully constructed to contain only a small amount of the code that comprises the entire computing system, code that might be necessary on the whole may still be excluded from partitions that contain particularly sensitive data. Accordingly, thoughtful use of partitioning in computer system can have advantages.

Thus, there is a need for a system and method that can to allow the use of partitioned software elements to provide both isolation and fault tolerance in virtual computer systems. The present invention addresses the aforementioned needs and solves them with additional advantages as expressed herein.

SUMMARY OF THE INVENTION

An aspect of the invention includes a method and system to allow accesses between virtual machines where one virtual machine requests access to another virtual machines' allocated resources. One embodiment of the invention includes placing a virtual service provider in a partition generated by a first partition and virtual service clients in different partitions. If the dedicated service provider partition fails, the generating first partition may recover the service provider partition because of the isolation provided by the architecture.

In another embodiment, chained virtual service providers can provide computer resource services to virtual service clients such that a service client may use the full string of the concatenated services or only a portion of the concatenated services. If a fault in a lower-order service provider partition occurs, it does not affect the services of higher-order partitions that are chained together.

In another embodiment, aggregation and redundancy may be achieved in a virtual service provider and service client environment. In one example, similar chained computer services may be placed in parallel and accessed via another service provider in another partition. If one of the similar services fails in one partition, the other partition may be used as a backup. In another example, if similar chained computer services are placed in parallel and accessed via another service provider in another partition, then the services may be aggregated such that a multiplicity of services may be obtained to effectively increase the capability of the computer resource to handle a large virtual service client load.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

In one embodiment of the invention, a partitioned system, which may represent partitions in a virtual machine environment, contains software programs called virtual service providers and virtual service clients. A virtual service provider (VSP) is a software module which provides a service to a partition or virtual machine. Often, the VSP is a part of the software stack which controls physical hardware. However, VSPs may also provide control to non-hardware computer resources. When VSPs correspond to a specific piece of hardware, they often perform a role that involves arbitrating access to that device and allowing its resources to be shared among multiple clients. Often, the clients are unaware that they are sharing the computer hardware resource.

A virtual service client (VSC) is a software module which consumes a service offered by a VSP. The VSC appears to the operating system in which it runs as hardware, or as a plug-in module that takes the place of a module that managed physical hardware. Also, a VSC can enable a partition to acquire non-hardware services from a non-hardware oriented VSP. A combination of VSPs and VSCs in a partitioned environment can provide isolation, fault tolerance, and chained and aggregated services.

Exemplary Embodiments of the Invention

Figure 2:
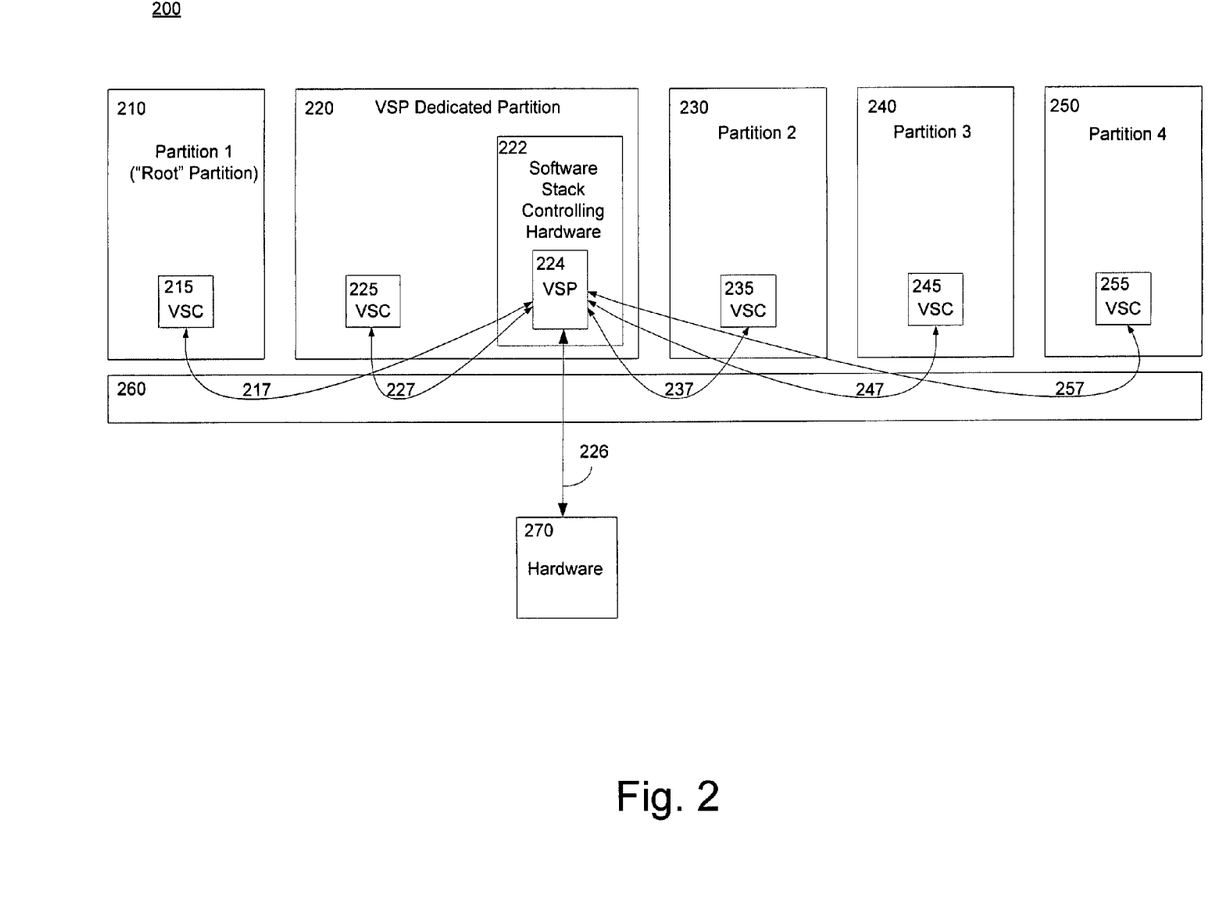
FIG. 2 is an exemplary partitioned system having a dedicated partition aspect of the invention.

FIG. 2 depicts an embodiment of the invention. A partitioned system 200 is shown having a first partition 210 and a dedicated VSP partition 220. The first partition 210 creates or generates the VSP dedicated partition 220 to contain the VSP 224 which is part of the software stack controlling hardware module 222. The controlled hardware is linked 226 to the VSP 224 and thus the VSP 224 providing access. In another aspect, virtual service clients (VSCs) are scattered in the system in various partitions. A second partition 230, a third partition 240, as well as a fourth partition 250 may contain virtual service clients 235, 245 and 255 respectively. Each VSC can communicate with the VSP 224 via a communications channel. In one embodiment the communications channel is a virtualization software program.

VSCs can also be located in the root partition 210 or the VSP dedicated partition 220. Each VSC in the system 200 functions to access the VSP virtualization of the hardware device 270. This access provides functionality to each partition in which a VSC resides. The advantage of the architecture of FIG. 2 over that of FIG. 1 is that the first partition 210 is isolated from the VSP partition 220 containing the software stack 222. If a fault occurs in any piece of software that resides in partition 220, including the software stack 222 that affects the VSP 224, then the second 230, third 240 and fourth 250 partition may be adversely affected. Even VSCs 215 and 225 and their corresponding operative connectivity in the first partition 210 and the dedicated partition 220 may be adversely affected. However, because the first partition 210 created the VSP dedicated partition, the first partition is able to update, repair or reconstruct the VSP dedicated partition 220 to reestablish functionality of the VSP dedicated partition. The advantage of fault isolation and recovery is established because of the parent and child relationship of the first partition 210 to the VSP dedicated partition 220.

Figure 2A:
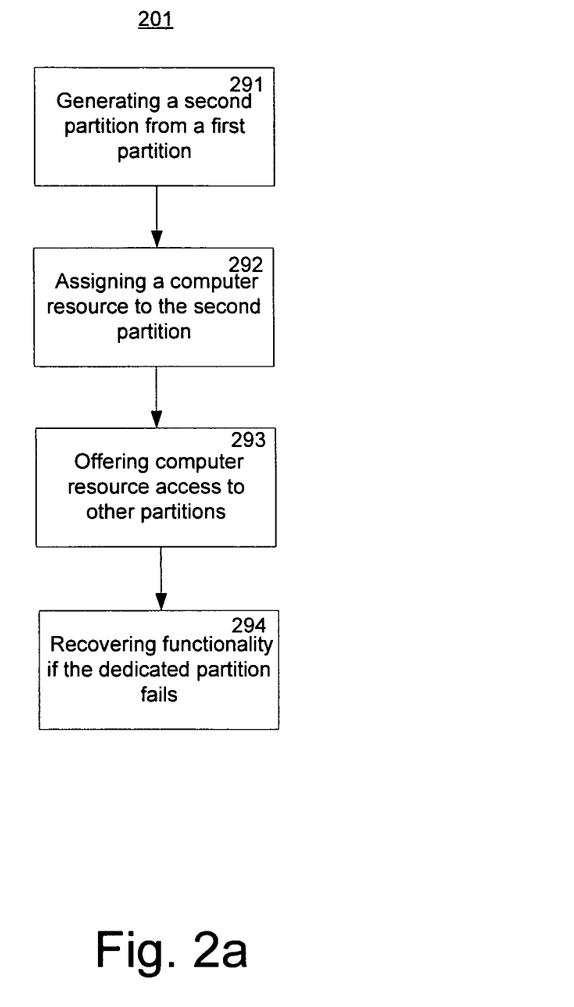
FIG. 2a is an exemplary flow diagram for a dedicated partition aspect of the invention.

FIG. 2a depicts a method of an embodiment according to the invention. The method 201 is useful for generating a VSP dedicated partition as shown in FIG. 2. The method 201 may begin by generating a dedicated partition from a first partition (step 291) where the first partition is considered a "root partition"; an initial partition that is responsible for creating subsequent partitions, assigning them hardware resources, typically according to a user-defined policy. The dedicated partition contains a VSP. The VSP in the dedicated partition is assigned a computer resource (step 292). VSCs may be located in other partitions including the first and dedicated partitions. The computer resource associated with the dedicated partition may be offered to other partitions in a partitioned system (step 293). This offer allows other partitions to use the VSP to access the computer resource in an isolated fashion. If a fault occurs in the VSP dedicated partition which renders all or a part of the dedicated partition non-responsive, then the first partition, which is unaffected by the fault, may recover the functionality of the dedicated partition (step 294). This allows a level of fault isolation between the dedicated partition and the generating first partition.

Figure 3:
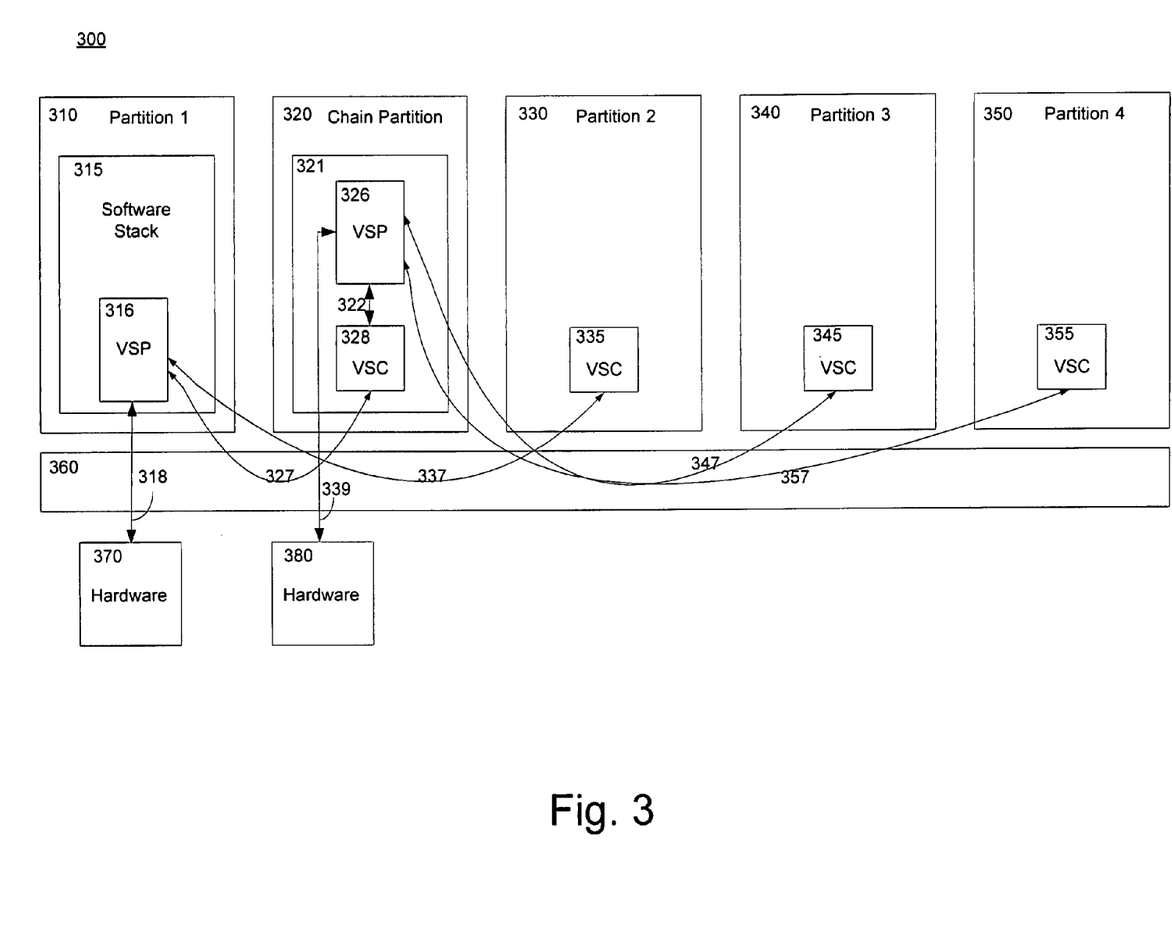
FIG. 3 is an exemplary partitioned system having a chained partition aspect of the invention.

FIG. 3 depicts an embodiment of the invention using chained virtual service providers in different partitions providing services to different clients in different partitions. According to the embodiment, there are two VSP software packages; each one in its own partition. A first partition 310 contains a software stack 315 having a VSP 316 which has access to a hardware device 370. A chain partition 320 has a software stack 321 having a VSP 326 interconnected 322 with a VSC 328. The VSP 326 has access to a computer resource such as hardware, software, or other capacity such as time and bandwidth. In the example of FIG. 2, VSP 326 has access to a hardware computer resource 380. The VSC 328 provides interconnection 327 to VSP 316 in the first partition 310.

Virtual service clients reside in other partitions which can use the services that the VSPs provide. For example, VSC 335, residing in a second partition 330 may be linked 337 to VSP 316 in the first partition 310. VSC 345 is linked 347 to VSP 326 in the chain partition. VSC 355 in a fourth partition 350 is also linked 357 to VSP 326 in the chain partition. Each of the links 327, 337, 347 and 357 use communications channel 360 to communicate the between providers and clients of services.

VSC 335, via link 337, can use the services provided by VSP 316 and its associated hardware, 370. For example, if hardware 370 was a network interface, then information from the second partition 330 could be transmitted through a network as a result of the network interface service provided by the VSP 316 of the first partition 310. VSC 345, via link 347, can use the services provided by VSP 326 and its associated hardware 380. For example, if hardware 380 was encryption hardware, then information from the third partition 340 could be encrypted as a result of the service provided by the VSP 326 of the chain partition 320.

The use of link 322 can then invoke the VSC 328 of the chain partition 320 to communicate the encrypted data of the third partition 340, via link 327, to the VSP 316 of the first partition 310. The encrypted information of the third partition can then be sent to a network destination via the network interface service connection via hardware 370. Thus, the configuration 300 of FIG. 3 allows some partitions to use a chained sequence of services of VSPs in different partitions. In the example presented, information of the third partition 340 can use the VSP of the chain partition to encrypt data using hardware 380 before using the VSP of the first partition 310 to transmit the data out onto a network using hardware 370. In the example, the fourth partition 350 is likewise enabled by it connection 357 to the chain partition 320 and the VSP associated with encryption hardware 380.

The configuration 300 of FIG. 3 displays the ability of multiple VSCs to use multiple VSPs. A VSC can connect in a chain to use all or a portion of the hardware chaining made available. For example, a VSC can connect to a VSP at the end of a chained set of partitioned VSPs to use the full ensemble of chained hardware. For example, if another VSP in another partition were available, the last element in the chain may be data compression hardware or a data compression algorithm, the next higher chained VSP could provide encryption hardware services, the next higher chained VSP could provide a network interface for network connectivity. Also, a VSC can enter an intermediate step in the chained VSP configuration to get for example, just encryption and network services. Another VSC in a partition could access the chained VSPs at another point and receive just network services. In another embodiment, there could be a "filter" in the chain such as a firewall or anti-virus software that blocks certain I/O requests according to a predefined policy.

In another aspect of the invention, if a partition of the chained elements failed due to some fault in the partition in which it resided, higher layers of the chained VSPs could still be used. For example, if a compression service partition failed, a functional VSC could still use the encryption and network service VSPs because their respective partitions can be unaffected by the fault in the compression service partition. Thus, the chained configuration of FIG. 3 provides fault isolation between chained partitions. In an alternate example, there may also be a one-to-one relationship between VSPs and VSCs in a system, with an aggregation happening at some other layer which may render additional fault isolation.

Figure 3A:
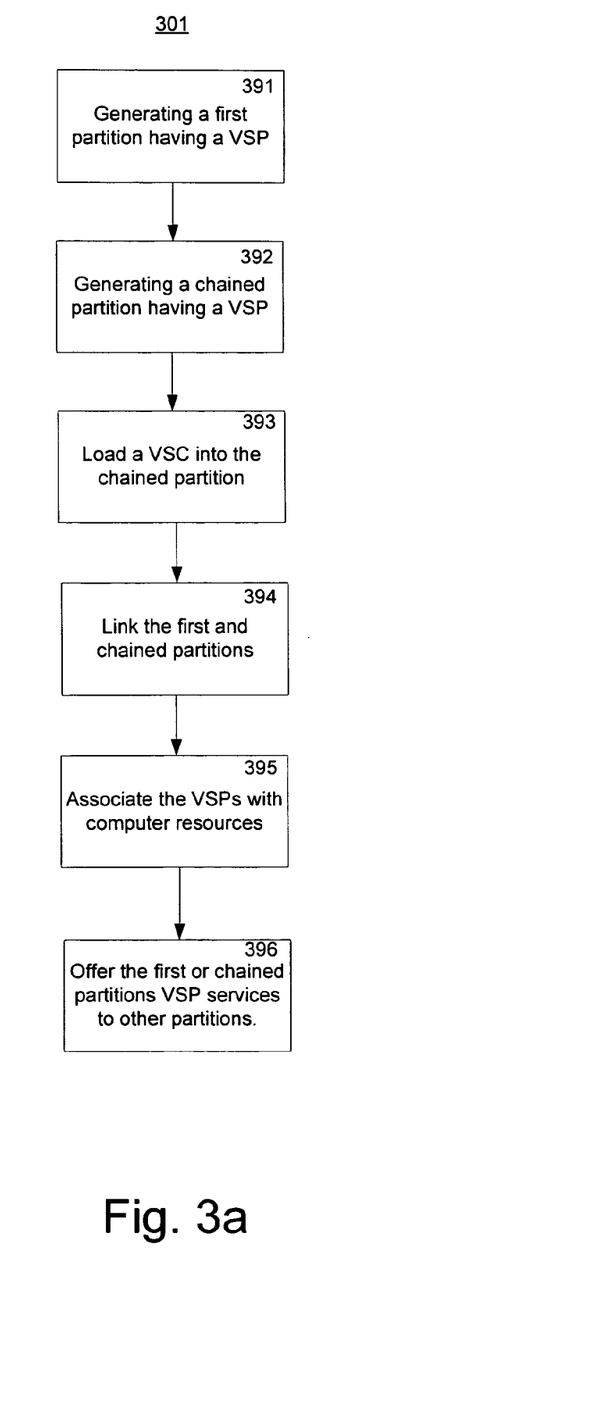
FIG. 3a is an exemplary flow diagram for a chained partition aspect of the invention.

FIG. 3a depicts a method of an embodiment according to the invention. The method 301 is useful for generating a chained series of VSP functions as shown in FIG. 3. The method 301 may begin by generating a first partition having a VSP (step 391). Next, a chain partition is generated also having a VSP (step 392). A VSC is then loaded into the chained partition (step 392). Then the VSP of the first partition is linked to the VSP of the chained partition through the loaded VSC in the chained partition (step 394). In this manner, multiple VSPs can be chained such that a succeeding VSP is linked to a prior VSP in a series fashion with a VSC. The VSC and VSP software interfaces make the interface from one VSP function to another VSP function transparent to any user of the function.

The VSPs are preferably associated with a computer resource such as a hardware, software, I/O, firmware, or non-hardware resource such as bandwidth or time slice access (step 395). Additional examples of VSP associations are disk storage, audio service, video service, input ports and output ports such as USB or other serial interfaces or parallel interfaces. VSCs may be located in other partitions as users of the VSP resources and may be offered the VSP resources (step 396). As before, this offer allows other partitions to use the VSP access to the computer resources in an isolated manner. In addition, the resources are essentially chained together such that one function may follow the next.

One example (not shown) of a series string of chained resources is compression, encryption and network access. One VSC in an isolated partition may use all three functions in a serial and transparent manner by accessing a compression VSP which is connected to an encryption VSP which is connected to a network interface VSP. One VSP is connected to another VSP via a VSC. An intermediate entry point is also possible. For example, an isolated VSC may desire to use only the encryption and network VSP service and may therefore bypass the compression VSP by connecting to the encryption VSP which is chained to the network interface VSP. Also a different VSC which desires only network interface services may bypass the compression and encryption VSP functions and interface directly with the VSP that provides the network interface function. In one aspect of the invention, the interfaces between the VSPs and VSCs are the same throughout a chain. For example, there can be three partitions in a chain and each exposes a network interface. However, a first partition does compression and a second partition does encryption, but to the VSCs both are accesses to a third partition network connection. It just happens that the first and second partitions can perform their compression and encryption on a network packet.

Additional, increasingly more complex chained partitions functions may be added by adding different VSPs and VSCs in partitions, assigning computer resources to the added VSPs and offering the new services to other VSCs. If a fault occurs in a partition along the chain, the VSP in the failed partition may be unavailable. But the VSPs located further down the chain are still available. This allows a level of fault isolation VSCs and VSPs in different partitions that are not directly affected by the fault in another partition.

Figure 4:
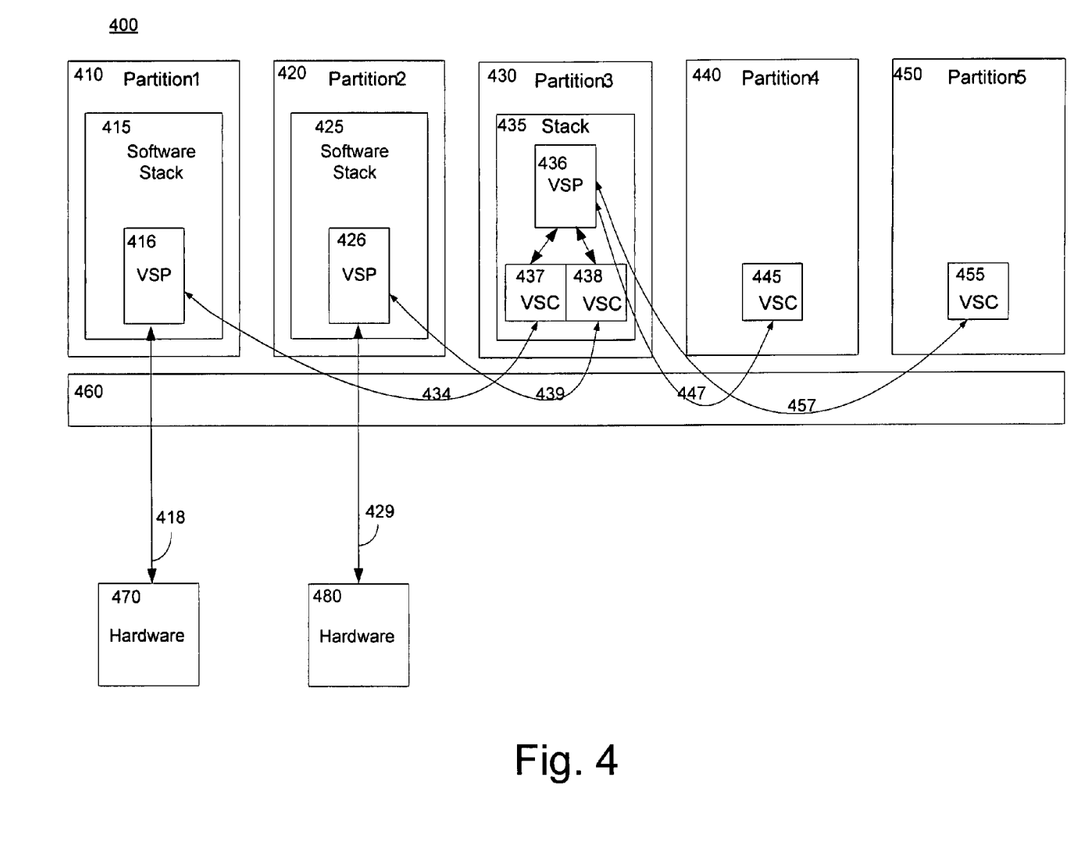
FIG. 4 is an exemplary partitioned system having a chained and parallel service aspect of the invention.

FIG. 4 is one embodiment of the current invention. The configuration 400 of FIG. 4 contains multiple chained VSPs in a configuration with multiple VSCs which allow for failover control. A first partition 410 and a second partition 420 each contain a software stack and a corresponding VSP. Software stack 415 with VSP 416 associated with link 418 and hardware 470 resides in a first partition 410 and software stack 425 with VSP 426 associated with link 429 and hardware 480 resides in a second partition 420. A fourth partition 440 contains VSC 445 and a fifth partition 450 contains VSC 455.

A third partition 430 contains software stack 435 having VSP 436 and VSC 437 and VSC 438. A chaining of VSP functions exists from the perspective of VSC 445 and 455. VSC 455 is connected 457 to VSP 435 in the third partition 430. Likewise, VSC 445 is linked 447 to VSP 436 in the third partition 430. VSP 436 is then chained via VSC 437 to link 434 to VSP 416 in the first partition 410. VSP 436 is also chained via VSC 438 to link 439 to VSP 426 in the second partition 420. As before, links between different partitions are accommodated with a communication channel 460. The VSP 436 of the third partition 430 may be understood to be associated with a computer resource (not shown) which may be a hardware or non-hardware resource.

According to an aspect of the invention, VSC, VSPs and separate partitions may be grouped to accommodate various configurations for fault tolerance and isolation. In the configuration of FIG. 4, if hardware 470 and 480 are similar or redundant, then, either VSP may be used in a chained configuration by the clients in the fourth 440 and fifth partitions 450. For example, if hardware 470 and 480 are network interfaces in a system where redundant network interfaces were important, then the configuration of FIG. 4 may be used to advantage. Assuming the VSP 436 provided a system resource of encryption, either by hardware, firmware, or software, the combination of VSP 436, VSC 437 and VSP 416 could supply encryption and network interface services to either the fourth 440 or fifth 450 partitions using link 418 and hardware 470. Likewise, the combination of VSP 436, VSC 438 and VSP 426 could supply encryption and network interface services to either the fourth 440 or fifth 450 partitions using link 429 and hardware 480.

In FIG. 4, the software stack 435 including VSP 436 and VSC 437 may be used to service the chaining needs of the fourth and fifth partitions and a failover mechanism is in place. If hardware 470 fails, or in the event some functionality in the first partition fails, the functionality of encryption and network interface connectivity to the fourth and fifth partitions could be maintained by switching the service of VSP 436 to flow through VSC 438 to use path 439 and VSP 426 to access link 429 and hardware 480. This failover service, a switch from the stack of VSP 436 and VSC 437 to the stack of VSP 436 and VSC 438 allows flexibility to use the alternate functions available in the second partition 420 instead of that of the first partition 420.

Another use of the configuration of FIG. 4 is that of aggregation. For example, if the network interface hardware of elements 470 and 480 do not have enough bandwidth to handle all of the data that may be originating from the VSCs of partitions 440 and 450, the combination bandwidth of the two hardware aspects 470 and 480 may be used in a cooperative manner to distribute the data and satisfy the overall bandwidth requirement. Here, if VSP 436 acts as an encrypter for data of the fourth and fifth partitions, VSP 436 may direct encrypted data to the combination of hardware elements 470 and 480 by using VSCs 437 and 438 respectively thorough partitions 410 and 420. Thus aggregation of data is possible with the configuration of FIG. 4.

As may be well appreciated by those of skill in the art, the combination of aspects of the present invention may be combined. For example, a VSP dedicated partition as in partition 220 in FIG. 2 may be combined with the chain partition 320 of FIG. 3 and with the failover provision of the third partition of FIG. 4. The combinations of these aspects may result in a system that exhibits any combination of isolation and fault tolerance in a partitioned system. Also, as the VSPs of a system provide computer resources, those resources may include hardware as well as non-hardware or pseudo hardware functionality such as firmware resources, software resources, aspects of computers such as bandwidth, time slice size or priority, packetization order or priority or other aspects such as power or signal control or activity scheduling. For example, the system 400 could employ the IEEE 802.1P standard support for improving support of time-critical network traffic and limiting the extent of high-bandwidth multicast traffic within a bridged LAN by introducing traffic class priorities.

Figure 4A:
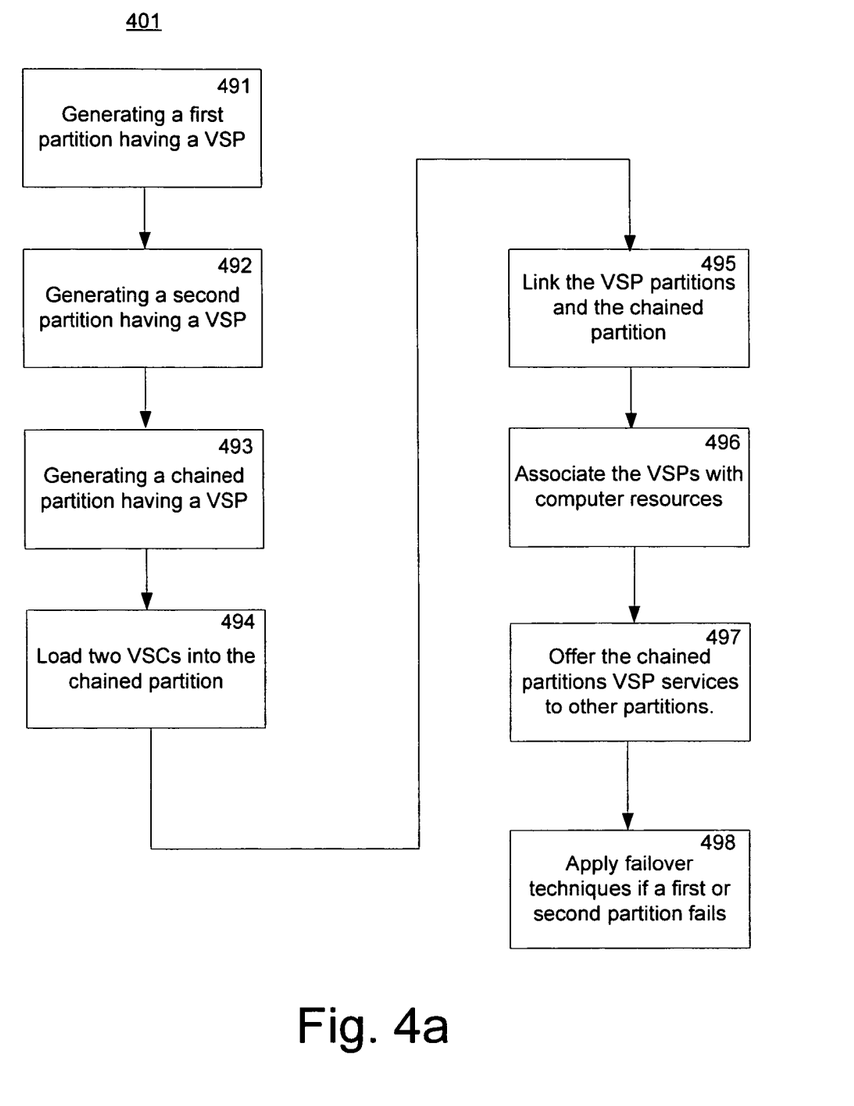
FIG. 4a is an exemplary flow diagram for a chained and parallel partition aspect of the invention.

FIG. 4a depicts a method of an embodiment according to the invention. The method 401 is useful for generating a chained series of VSP functions as shown in FIG. 4 with a failover capability. The method 401 may begin by generating a first partition having a VSP (step 491). A second partition is generated having a VSP (step 492). Next, a chain partition is generated also having a VSP (step 493). Two VSCs are then loaded into the chained partition (step 494). Then the VSP of the first partition and the VSP of the second partition are linked to the VSP of the chained partition through the two loaded VSCs in the chained partition (step 495). As before, multiple VSPs can be chained such that a succeeding VSP in linked to a prior VSP in a series fashion with a VSC. The two VSPs in the chained partition may be interconnected to separate VSPs in the first and second partitions such that the VSP in the chained partition may access either the VSP in either partition.

The VSPs in the various partitions are preferably associated with a computer resource (step 496) such as a hardware, software, I/O, firmware, or non-hardware resource such as bandwidth or time slice access. VSCs may be located in other partitions as users of the VSP resources and may be offered the VSP resources (step 497). As before, this offer allows other partitions to use the VSP access to the computer resources in an isolated manner. The computer resources are chained together such that one function may follow the next and the dual VSCs in the chained partition provide flexibility in offering services to VSCs when one of the first or second partitions fail (step 498).

For example, if the VSPs in the first and second partitions offer the similar computer resources, such as a network interface, and if the VSP in a first partition fails, the second partition VSP may be used as a backup. This is accomplished by using the second VSC in the chained partition to access the redundant (second partition) VSP. Consequently, even in a chained configuration, a level of redundancy may be employed. Additionally, aggregation is possible by using the first and second partitions in parallel. This allows, for example, a high throughput VSC to use chained and partitioned functions of lower bandwidth to accommodate the high bandwidth requirement.

Exemplary Computing Device

Figure 5:
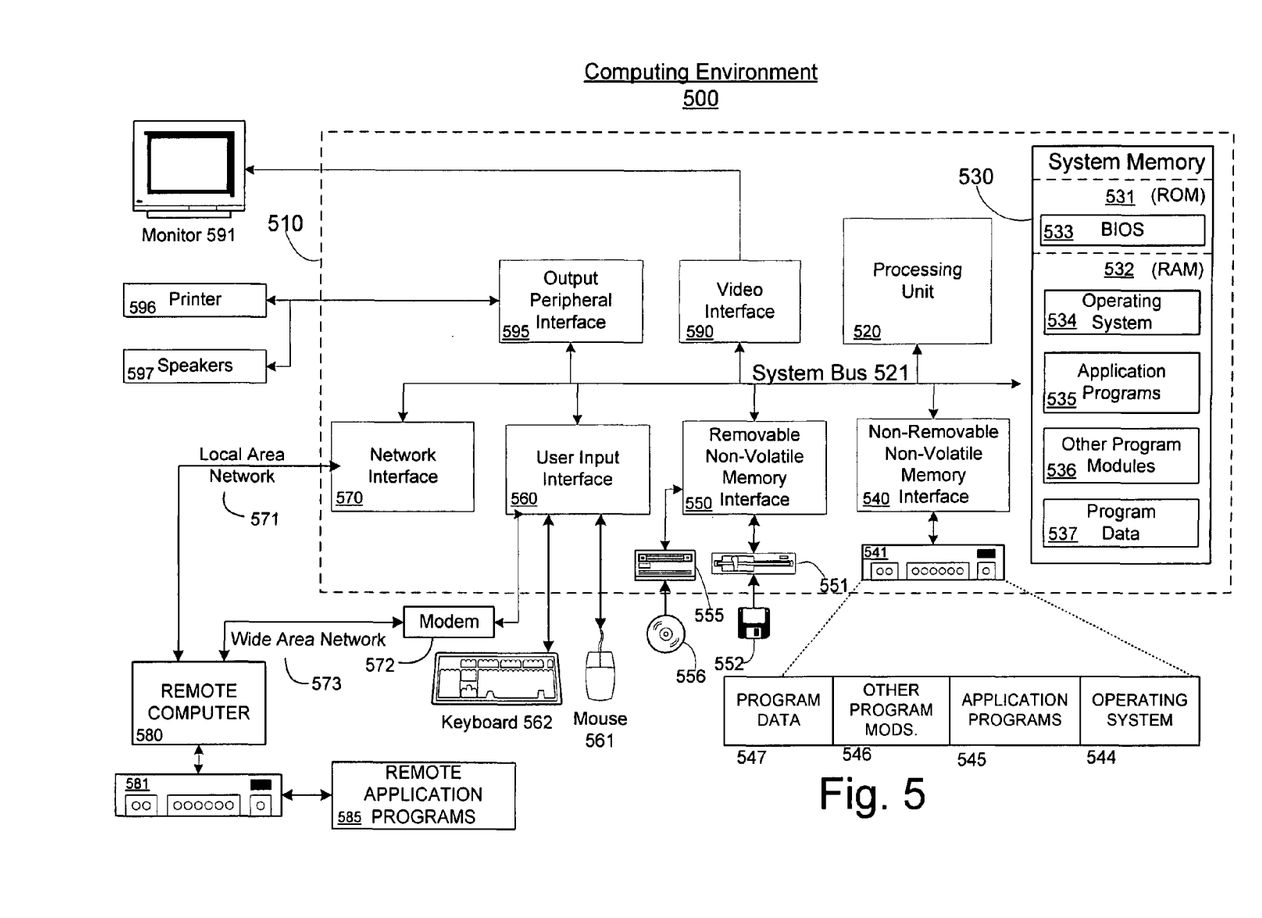
FIG. 5 is a block diagram showing an exemplary computing environment in which aspects of the invention may be implemented.

FIG. 5 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 5 thus illustrates an example of a suitable computing system environment 500 in which the embodiments of the invention may be implemented, although as made clear above, the computing system environment 500 is only one example of a suitable computing environment and is not intended to suggest any limitation as to the scope of use or functionality of an embodiment of the invention. Neither should the computing environment 500 be interpreted as having any dependency or requirement relating to any one or combination of components illustrated in the exemplary operating environment 500.

With reference to FIG. 5, an exemplary system for implementing an embodiment of the invention includes a general purpose computing device in the form of a computer system 510. Components of computer system 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 510 typically includes a variety of computer readable media. Computer readable media can be any available media that can be accessed by computer system 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer system 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer system 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5 provide storage of computer readable instructions, data structures, program modules and other data for the computer system 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer system 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 591 or other type of display device is also connected to the system bus 521 via an interface, such as a video interface 590, which may in turn communicate with video memory (not shown). In addition to monitor 591, computer systems may also include other peripheral output devices such as speakers 597 and printer 596, which may be connected through an output peripheral interface 595.

The computer system 510 may operate in a networked or distributed environment using logical connections to one or more remote computers, such as a remote computer 580. The remote computer 580 may be a personal computer, a server, a router, a network PC, a peer device or other common network node, and typically includes many or all of the elements described above relative to the computer system 510, although only a memory storage device 581 has been illustrated in FIG. 5. The logical connections depicted in FIG. 5 include a local area network (LAN) 571 and a wide area network (WAN) 573, but may also include other networks/buses. Such networking environments are commonplace in homes, offices, enterprise-wide computer networks, intranets and the Internet.

When used in a LAN networking environment, the computer system 510 is connected to the LAN 571 through a network interface or adapter 570. When used in a WAN networking environment, the computer system 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer system 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method to partition providers and clients in a virtual machine environment. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of managing resources in a host computer, the method comprising:
generating a first partition, a second partition, and a third partition, the first partition comprising a first instance of virtual service provider software and a first instance of virtual service client software, the first instance of virtual service provider software being configured to link the first instance of virtual service client software to one or more first host computer resources, the second partition comprising a second instance of virtual service provider software and a second instance of virtual service client software, the first instance of virtual service client software being configured to link the second instance of virtual service provider software to a first resource from the one or more first host computer resources, the second instance of virtual service provider software being configured to link the second instance of virtual service client software to one or more second host computer resources, the third partition comprising a third instance of virtual service provider software and a third instance of virtual service client software, the third instance of virtual service provider software being configured to link the third instance of virtual service client software to one or more third host computer resources, the third instance of virtual service client software being configured to link the second instance of virtual service provider software to a third resource from the one or more third host computer resources;
allowing the second instance of virtual service client software to access either the first resource or the third resource by way of a dual chain of functionality, a first chain of the dual chain of functionality comprising the second instance of virtual service provider software, the first instance of virtual service client software, and the first instance of virtual service provider software, and a second chain of the dual chain of functionality comprising the second instance of virtual service provider software, the third instance of virtual service client software, and the third instance of virtual service provider software, the first resource and the third resource being similar and upon failure of one of the first or the third resource, the second virtual service provider relying on the other resource to allow the second virtual service provider to continue service to the second virtual service client; and the second partition being generated by the first partition and after a fault occurs in the second partition, the first partition being configured to control the operation of the second partition to recover from the fault that occurred in the second partition.

2. The method of claim 1, wherein offering access to the first computer resource to the first instance of virtual service client software comprises offering access to a first hardware device to the first instance of virtual service client software in one of the first partition, the second partition and a third partition.

3. A method of managing system resources in a host computer, the method comprising:
generating a first instance of virtual service provider software for assignment with a first computer resource in a first partition comprising a first operating system, the first computer resource being part of an underlying computer system;
generating in the first partition a first instance of virtual service client software which is served resources by the first instance of virtual service provider software;
generating a second instance of virtual service provider software in a second partition comprising a second operating system, the first instance of the virtual service client software serving resources to the second instance of virtual service provider software;
assigning a second computer resource to the second instance of the virtual service provider software, the second computer resource being part of the underlying computer system;
generating a second instance of virtual service client software, the second instance of virtual service client software being served resources by the second instance of virtual service provider software through the first virtual service provider;
generating a third instance of virtual service client software in a third partition comprising a third operating system, the third instance of virtual client software serving resources to the second instance of virtual service provider software;
generating a third instance of virtual service provider software in the third partition, the third instance of virtual service provider software serving resources to the third instance of virtual service client software; and
assigning a third computer resource to the third instance of virtual service provider software;
the second instance of virtual service client software accessing a dual chain of functionality by accessing either the resources of the first virtual service provider or the third virtual service provider, a first chain of the dual chain of functionality comprising the second instance of virtual service provider software, the first instance of virtual service client software, and the first instance of virtual service provider software, and a second chain of the dual chain of functionality comprising the second instance of virtual service provider software, the third instance of virtual service client software, and the third instance of virtual service provider software; and
the third computer resource and the first computer resource being similar and upon failure of one of the first or the third computer resource, the second virtual service provider relying on the other resource to allow the second virtual service provider to continue service to the second virtual service client.

4. The method of claim 3, wherein the steps of generating a first instance of virtual service provider software for assignment with a first computer resource and assigning a second computer resource to the second instance of the virtual service provider software involve computer resources that are one of hardware computer resources and non-hardware computer resources.

5. The method of claim 4, wherein the hardware computer resources comprise network access, storage resources, audio and video service, and I/0 resources and the non-hardware resources comprise bandwidth and time-slice resources.

6. The method of claim 3, wherein the third computer resource and the first computer resource are similar and the second instance of the virtual service provider software aggregates data when serving resources to the second instance of the virtual service client software.

7. A computer system for managing resources in a virtual machine, the system comprising:
a computer device comprising a processor;
a memory in communication with said processor when the computer system is operational, said memory having stored thereon computer-readable instructions that upon execution by the processor, cause:
a first instance of virtual service provider software to serve resources to a first instance of virtual service client software, the first instance of virtual service provider software being associated with a first computer hardware resource, the first instance of virtual service provider and the first instance of virtual service client software executing in a first partition comprising a first operating system;
a second instance of virtual service provider software which is associated with a second computer resource and to be served resources by the first instance of virtual service client software, the second instance of virtual service provider executing in a second partition comprising a second operating system; and
a second instance of virtual service client software in the second partition to be served resources by the second instance of virtual service provider software;
a third instance of virtual service client software to serve resources to the second instance of virtual service provider software, the third instance of virtual client software executing in a third partition comprising a third operating system; and
a third instance of virtual service provider software, in the third partition, is associated with a third computer resource and to serve resources to the third instance of virtual service client software;
the second instance of virtual service client software accessing a dual chain of functionality by accessing either the resources of the first virtual service provider or the third virtual service provider, a first chain of the dual chain of functionality comprising the second instance of virtual service provider software, the first instance of virtual service client software, and the first instance of virtual service provider software, and a second chain of the dual chain of functionality comprising the second instance of virtual service provider software, the third instance of virtual service client software, and the third instance of virtual service provider software; and
the third computer resource and the second computer resource being similar and upon failure of one of the first or the third computer resources, the second virtual service provider relying on the other resource to allow the second virtual service provider to continue service to the second virtual server client.

8. The system of claim 7, further comprising:
a communications channel providing communications access between at least one instance of virtual service client software and an instance of virtual service provider software.

9. The system of claim 7, wherein the third computer resource and the first computer resource are similar and the second instance of virtual service provider software aggregates data when serving resources to the second instance of the virtual service client software.

10. The system of claim 7, wherein the first computer resource is network interface resource and the second computer resource is an encryption resource, wherein the second instance of virtual service client software can encrypt and transmit data across a network using the second and first instances of virtual service provider software respectively.

11. The system of claim 7, wherein the first computer resource and the second computer resource comprises one or more of a hardware computer resource and a non-hardware computer resource.

12. The system of claim 11, wherein the hardware computer resource comprises one of a CPU, memory, and input/output channel, disk space and a network interface.

13. The system of claim 11, wherein the non-hardware computer resource comprises one of a software program, bandwidth access and time slice access, and reordering.

14. The system of claim 13, wherein the reordering is according to IEEE 802.1P.

* * * * *